(12) United States Patent
Hara et al.

(10) Patent No.: US 7,068,824 B2
(45) Date of Patent: *Jun. 27, 2006

(54) FINGERPRINT MATCHING METHOD AND APPARATUS

(75) Inventors: Masanori Hara, Tokyo (JP); Kan Sato, Kanagawa (JP)

(73) Assignee: NEC Corporation, Tokyo (JP)

( * ) Notice: Subject to any disclaimer, the term of this patent is extended or adjusted under 35 U.S.C. 154(b) by 736 days.

This patent is subject to a terminal disclaimer.

(21) Appl. No.: 10/308,996

(22) Filed: Dec. 4, 2002

(65) Prior Publication Data

US 2003/0103659 A1  Jun. 5, 2003

(30) Foreign Application Priority Data

Dec. 5, 2001 (JP) .............................. 2001-371741

(51) Int. Cl.
*G06K 9/00* (2006.01)

(52) U.S. Cl. .................................................... 382/125

(58) Field of Classification Search ................ 382/115, 382/116, 124, 125
See application file for complete search history.

(56) References Cited

U.S. PATENT DOCUMENTS 4,607,384 A * 8/1986 Brooks ........................ 382/124
4,947,442 A * 8/1990 Tanaka et al. ............... 382/125
5,717,777 A * 2/1998 Wong et al. ................. 382/124

FOREIGN PATENT DOCUMENTS

| JP | 60-12674 | 4/1985 |
|---|---|---|
| JP | 01-211184 | 8/1989 |
| JP | 2-224076 | 9/1990 |
| JP | 7-57092 | 3/1995 |
| JP | 08-279039 | 10/1996 |
| JP | 2637764 | 4/1997 |
| JP | 2690103 | 8/1997 |
| JP | 2730179 | 12/1997 |
| JP | 2001-243465 | 9/2001 |

OTHER PUBLICATIONS

American National Standards Institute, "American National Standard for Information Systems-Data Format for the Interchange of Fingerprint Information", 1993, p. 25.

Japanese Office Action with partial English translation dated Oct. 26, 2005.

* cited by examiner

*Primary Examiner*—Joseph Mancuso
*Assistant Examiner*—Jonathan Schaffer
(74) *Attorney, Agent, or Firm*—McGinn IP Law Group, PLLC

(57) ABSTRACT

In a fingerprint image, this fingerprint matching method extracts as skeleton stability the area of a zone which is drawn around a pre-determined attention point and which does not contain any minutiae that are bifurcations or endpoints in ridges forming a fingerprint pattern, and calculates similarity by collating said skeleton stability thus extracted with skeleton stability already registered.

18 Claims, 10 Drawing Sheets

FINGERPRINT MATCHING METHOD AND APPARATUS

BACKGROUNDS OF THE INVENTION

1. Field of the Invention

The present invention relates to a fingerprint matching method and apparatus. In particular, the present invention relates to a fingerprint matching method and apparatus that can achieve high accuracy in matching fingerprints having fewer minutiae, such as endpoints and bifurcations in fingerprint ridges.

2. Description of the Related Art

A commonly-used conventional method of matching fingerprints has been to match fingerprint minutiae by focusing on endpoints and bifurcations in fingerprint ridges (endpoints and bifurcations are hereinafter referred collectively to "minutiae"), as is disclosed in Japanese Patent No. 2659046.

The above-mentioned conventional method, however, has several drawbacks, as follows.

Since this method uses minutiae alone as features of fingerprints, it can guarantee high matching accuracy only when there are a sufficient number of minutiae. However, it cannot achieve high matching accuracy when minutiae are inadequate in number, which case is often encountered with fragmental latent fingerprints.

In order to solve the problem of low matching accuracy experienced when minutiae are inadequate in number, an alternative method has been proposed that extracts non-minutia data and uses both minutiae and non-minutia data for matching fingerprints, as is disclosed in Japanese Patent No. 002730179. In this method, when there are no minutiae in a small zone of a pre-determined size, the central coordinates of that zone and the ridge direction in the same zone are registered as non-minutia data. This method, however, does not use the degree of stability of skeletons in relation to the size of the zone having no minutiae.

Furthermore, the method disclosed in the above-described patent handles a non-minutia or minutia as one checkpoint indiscriminately, and verifies the possibility that such non-minutia or minutia contained in a fingerprint on the search side may form a pair with the corresponding non-minutia or minutia in a fingerprint on the registration side. This approach inevitably places a limit on the effectiveness of this method. For example, if one fingerprint has a minutia at a particular position and the other fingerprint has a non-minutia at the corresponding position, the minutia and non-minutia can be effectively used in a subtraction for matching scores (penalization).

On the other hand, if both a fingerprint on the search side and a fingerprint on the registration side have non-minutia data, their scores will be subjected to an addition process. This way, the resultant degree of separation of the non-mate fingerprints based on these scores is not large. The reason for this is that many non-minutia data are extracted from the non-mate fingerprints, making it difficult to separate the mate fingerprint from the non-mate fingerprints. One such example will be described below with reference to a diagram attached hereto.

FIGS. 7A and 7B shows a fingerprint on the search side. Of these, FIG. 7A shows a latent fingerprint and FIG. 7B a sample gray scale image of a mate fingerprint. FIGS. 8A and 8B show skeleton data for FIGS. 7A and 7B, respectively.

In FIGS. 8A and 8B, less reliable areas are enclosed in shaded rectangles.

In relation to the skeleton data in FIGS. 8A and 8B, FIGS. 9A and 9B represent non-minutia data, N1S, N2S, ..., N7S, in the search-side fingerprint and non-minutia data, N1F, N2F, ..., N7F, in the mate fingerprint, respectively, all of which were extracted using the method described in Japanese Patent No. 002730179. In a collation with this mate fingerprint, all the seven non-minutia data shown in this diagram match and thus a score of seven points is assigned.

FIGS. 10A and 10B show non-minutia data and minutiae when the fingerprint on the registration side is a non-mate fingerprint. Extracted from this example are six non-minutia data, N1F, N2F, N3F, N5F, N6F, and N7F, as well as one minutia, M4F. In a collation with this non-mate fingerprint, a score of 6 points is assigned because six non-minutia data match, while 1 point is subtracted from this score as a penalty because the non-minutia, N4S, on the search side does not match. The resultant score is 5 points.

The 7-point score for the mate fingerprint and the 5-point score for the non-mate fingerprint do not represent a sufficient degree of separation, demonstrating the need for an improved method with higher matching accuracy.

SUMMARY OF THE INVENTION

The present invention addresses the above-described problem held by conventional arts, with the object of realizing a method and apparatus that can collate fingerprints with higher accuracy even if they are fragmental latent fingerprints having a limited number of minutiae.

According to the first aspect of the invention, a fingerprint matching method, comprising the steps of in a fingerprint image, extracting as skeleton stability the area of a zone which is drawn around a pre-determined attention point and which does not contain any minutiae that are bifurcations or endpoints in ridges forming a fingerprint pattern; and calculating similarity by collating the skeleton stability thus extracted with skeleton stability already registered.

In the preferred construction, the fingerprint matching method further comprises the steps of representing the skeleton stability as a number that expresses the radius of a circle inscribed in a zone having no minutiae in units of skeleton width (pitch of skeleton).

In another preferred construction, the fingerprint matching method further comprises the steps of representing the skeleton stability as the radius of a circle inscribed in a zone having no minutiae.

In another preferred construction, the fingerprint matching method further comprises the steps of limiting attention points to those points that are on skeletons.

In another preferred construction, the fingerprint matching method further comprises the steps of along with the skeleton stability, extracting minutiae in the fingerprint image and calculating similarity by also collating the extracted minutiae with the minutiae already registered, and integrating the similarity based on the skeleton stability with the similarity based on the minutiae, and determining the similarity between fingerprints.

In another preferred construction, the fingerprint matching method further comprises the steps of representing the skeleton stability as a number that expresses the radius of a circle inscribed in a zone having no minutiae in units of skeleton width, along with the skeleton stability, extracting minutiae in the fingerprint image and calculating similarity by also collating the extracted minutiae with the minutiae already registered, and integrating the similarity based on the skeleton stability with the similarity based on the minutiae, and determining the similarity for a fingerprint.

In another preferred construction, the fingerprint matching method further comprises the steps of representing the skeleton stability as the radius of a circle inscribed in a zone having no minutiae, along with the skeleton stability, extracting minutiae in the fingerprint image and calculating similarity by also collating the extracted minutiae with the minutiae already registered, and integrating the similarity based on the skeleton stability with the similarity based on the minutiae, and determining the similarity for a fingerprint.

In another preferred construction, the fingerprint matching method further comprises the steps of limiting attention points to those points that are on skeletons, along with the skeleton stability, extracting minutiae in the fingerprint image and calculating similarity by also collating the extracted minutiae with the minutiae already registered, and integrating the similarity based on the skeleton stability with the similarity based on the minutiae, and determining the similarity for a fingerprint.

According to the second aspect of the invention, a fingerprint matching apparatus, comprises a fingerprint image inputting means into which a fingerprint image is input, a skeleton stability extracting means for, in relation to the fingerprint image input into the fingerprint image inputting means, extracting as skeleton stability for use in collation of fingerprints the area of a zone which is drawn around a pre-determined attention point and which does not contain any minutiae that are bifurcations or endpoints in ridges forming a fingerprint pattern, and a skeleton stability collating means for calculating similarity by collating the skeleton stability thus extracted with skeleton stability already registered.

In the preferred construction, the skeleton stability extracting means represents the skeleton stability as a number that expresses the radius of a circle inscribed in a zone having no minutiae in units of skeleton width.

In another preferred construction, the skeleton stability collating means represents skeleton stability as the radius of a circle inscribed in a zone having no minutiae.

In another preferred construction, the skeleton stability extracting means limits attention points to those points that are on skeletons.

In another preferred construction, the fingerprint matching apparatus further comprises a minutiae extracting means for, in relation to the fingerprint input into the fingerprint image inputting means, extracting minutiae for use in collation of fingerprints, along with skeleton stability, a minutia collating means for calculating similarity by collating the minutiae thus extracted with minutiae already registered, and a matching score integration means for integrating the similarity based on the skeleton stability with the similarity based on the minutiae, and calculating similarity.

In another preferred construction, the skeleton stability extracting means represents the skeleton stability as a number that expresses the radius of a circle inscribed in a zone having no minutiae in units of skeleton width, and the fingerprint matching apparatus further comprises a minutiae extracting means for, in relation to the fingerprint input into the fingerprint image inputting means, extracting minutiae for use in collation of fingerprints, along with skeleton stability, a minutia collating means for calculating similarity by collating the minutiae thus extracted with minutiae already registered, and a matching score integration means for integrating the similarity based on the skeleton stability with the similarity based on the minutiae, and calculating similarity.

In another preferred construction, the skeleton stability collating means represents skeleton stability as the radius of a circle inscribed in a zone having no minutiae, and the fingerprint matching apparatus further comprises a minutiae extracting means for, in relation to the fingerprint input into the fingerprint image inputting means, extracting minutiae for use in collation of fingerprints, along with skeleton stability, a minutia collating means for calculating similarity by collating the minutiae thus extracted with minutiae already registered, and a matching score integration means for integrating the similarity based on the skeleton stability with the similarity based on the minutiae, and calculating similarity.

According to another aspect of the invention, a fingerprint matching program that is run on a computer for matching fingerprints, comprising the functions of in a fingerprint image, extracting as skeleton stability the area of a zone which is drawn around a pre-determined attention point and which does not contain any minutiae that are bifurcations or endpoints in ridges forming a fingerprint pattern, and calculating similarity by collating the skeleton stability thus extracted with skeleton stability already registered.

In the preferred construction, the fingerprint matching program further comprises the function of representing the skeleton stability as a number that expresses the radius of a circle inscribed in a zone having no minutiae in units of skeleton width.

In the preferred construction, the fingerprint matching program further comprises the functions of along with the skeleton stability, extracting minutiae in the fingerprint image and calculating similarity by also collating the extracted minutiae with the minutiae already registered, and integrating the similarity based on the skeleton stability with the similarity based on the minutiae, and determining the similarity between fingerprints.

The present invention designed to accomplish the object described above minutiae collation of fingerprints, wherein the size of a zone with no minutiae is extracted as the degree of stability of ridges and the resultant degree is used as distinctiveness for collation purposes. By this, the present invention can improve matching accuracy even when fingerprints having fewer minutiae are collated.

The present invention uses skeleton data, which is a finer version of ridges. Therefore, the term "ridge stability" represents the same concept as "skeleton stability."

The stability of skeletons (ridges) as used in the present invention is extracted as the area of a proximate zone around an attention point when the skeletons form a stable striped pattern and when there are no minutiae within the proximate zone. The stabilities of skeletons (ridges) thus extracted from two fingerprint data to be verified are compared between corresponding zones, and the lower of the two stabilities is scored as a similarity.

By utilizing skeleton stability as distinctiveness, the present invention is capable of improving matching accuracy even when comparing fingerprints having fewer minutiae.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be restrictive to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
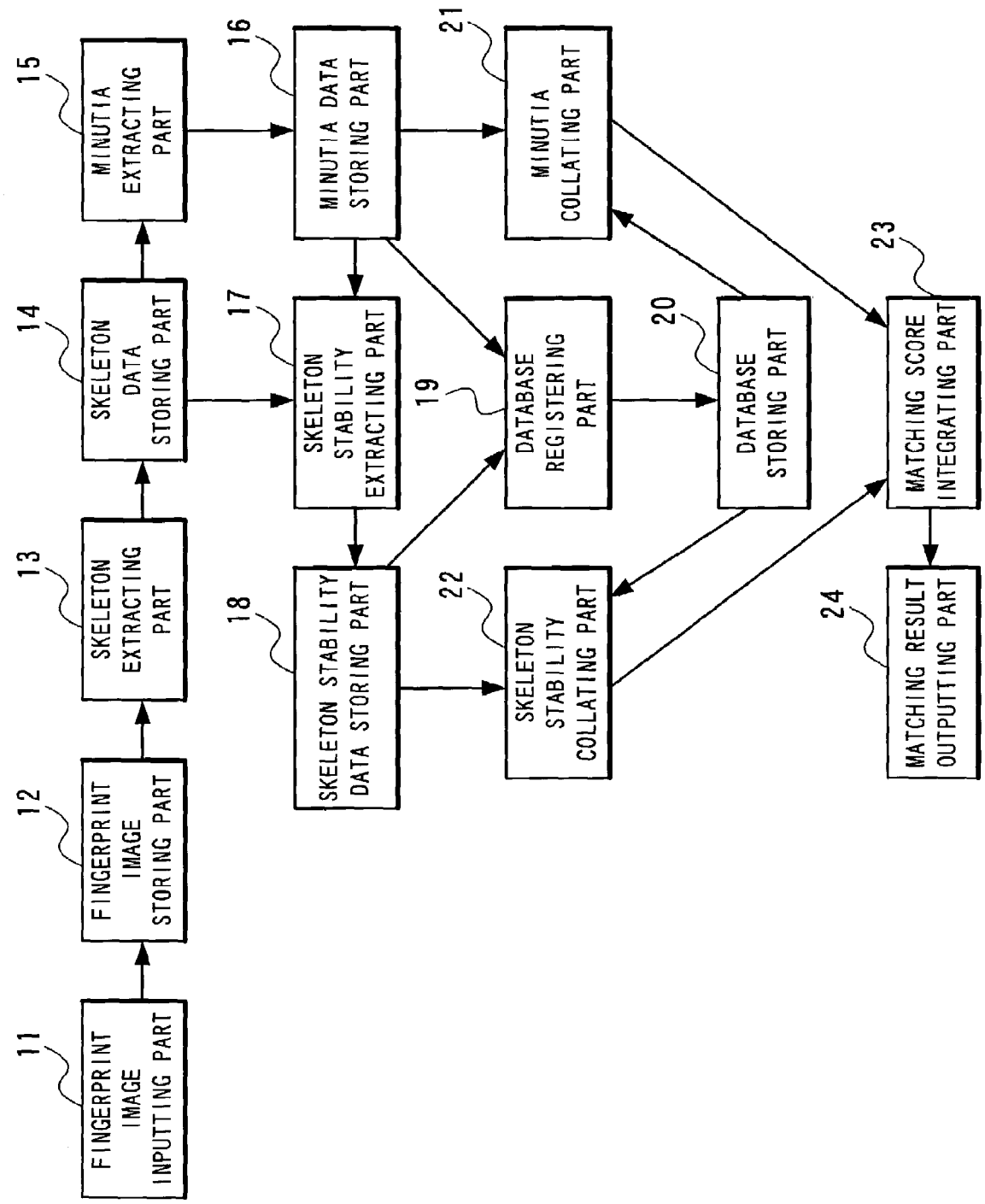
FIG. 1 is a diagram showing the configuration of an embodiment of a fingerprint matching apparatus according to the present invention.
Figure 2:
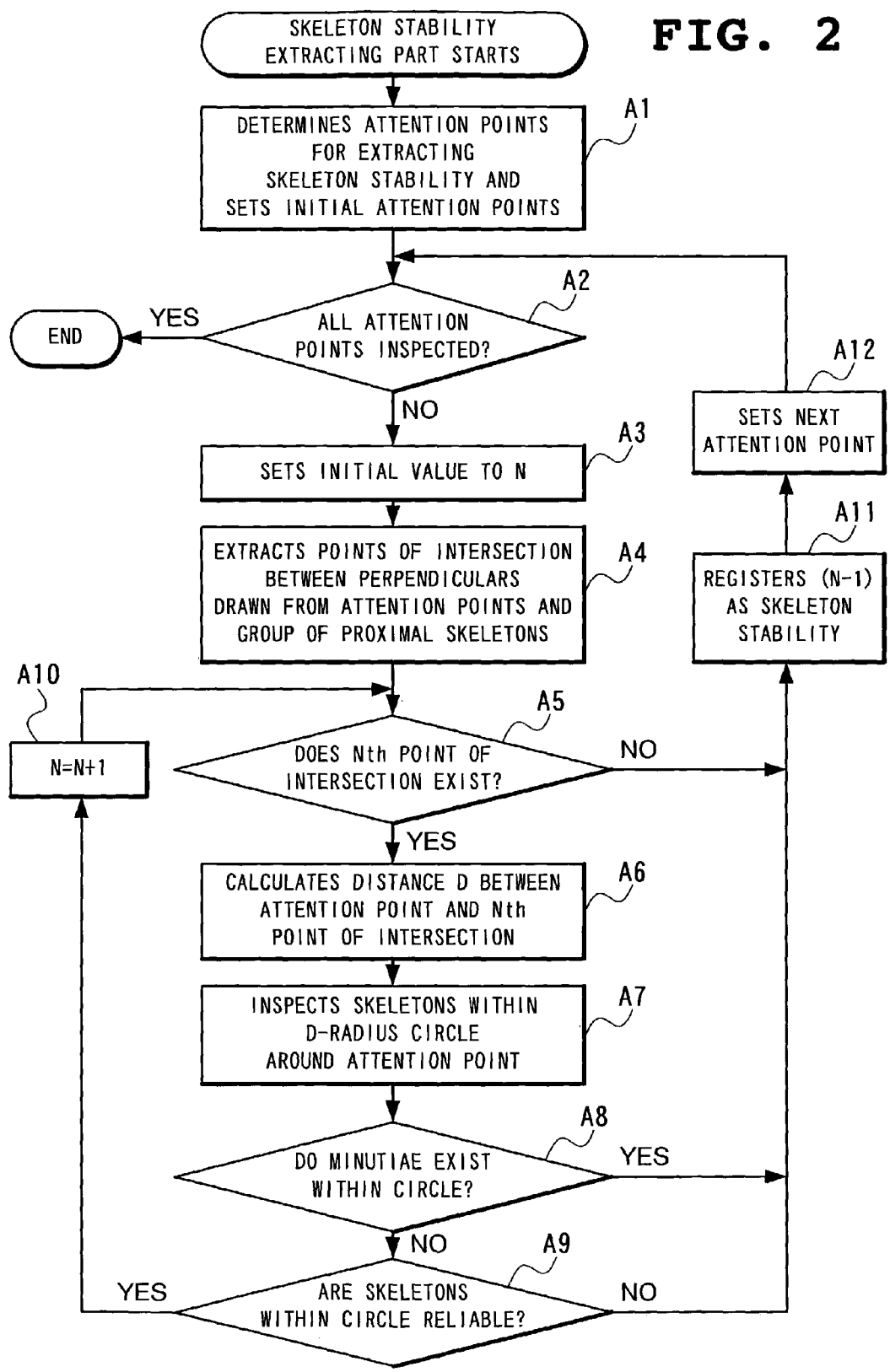
FIG. 2 is a flow chart showing the operation of the skeleton stability extracting part 17 in FIG. 1.

FIG. 1 is a diagram showing the configuration of an embodiment of a fingerprint matching apparatus according to the present invention. FIG. 2 is a flow chart showing the operation of the skeleton stability extracting means 17 in FIG. 1.

The fingerprint matching apparatus of this embodiment comprises a fingerprint image inputting part 11, a fingerprint image storing part 12, a skeleton extracting part 13, a skeleton data storing part 14, a minutia extracting part 15, a minutia data storing part 16, a skeleton stability extracting part 17, a skeleton stability data storing part 18, a database registering part 19, a database storing part 20, a minutia collating part 21, a skeleton stability collating part 22, a matching score integration part 23, and a matching result outputting part 24.

The fingerprint image inputting part 11 digitizes and inputs fingerprint images that have been read via a fingerprint sensor or scanner.

The fingerprint image storing part 12 stores fingerprint images that have been input from the fingerprint image inputting part 11 for a temporary period.

The skeleton extracting part 13 conducts the binarization and thinning processes on the fingerprint image stored in the fingerprint image storing part 12 to extract skeleton data.

The skeleton data storing part 14 stores the skeleton data extracted by the skeleton extracting part 13 for a temporary period.

The minutia extracting part 15 extracts minutiae from the skeleton data stored in the skeleton data storing part 14.

The minutia data storing part 16 stores the minutia data extracted by the minutia extracting part 15 for a temporary period.

The skeleton stability extracting part 17 extracts skeleton stability from the skeleton data stored in the skeleton data storing part 14 and the minutia data stored in the minutia data storing part 16.

The skeleton stability data storing part 18 stores the skeleton stability data extracted by the skeleton stability extracting part 17 for a temporary period.

The database registering part 19 registers in the database the minutia data stored in the minutia data storing part 16 and the skeleton stability data stored in the skeleton stability data storing part 18.

The database storing part 20 stores minutia data and skeleton stability data permanently.

The minutia collating part 21 collates the minutia data extracted from the fingerprint image that has been input for use in search, with the minutia data registered in the database storing part 20, and calculate the similarity between these data.

The skeleton stability collating part 22 collates the skeleton stability data extracted from the fingerprint image that has been input for use in search with the skeleton stability data registered in the database storing part 20, and calculate the similarity between these data.

The matching score integration part 23 integrates the matching score calculated by the minutia collating part 21 and the matching score calculated by the skeleton stability collating part 22, and calculates the similarity for both the minutia data and the skeleton stability data.

The matching result outputting part 24 outputs the matching score calculated by the matching score integration part 23.

The operation of this embodiment will now be described, beginning with the types of images that are subjected to processing by this embodiment and the processing method employed by this embodiment.

Figure 3:
FIG. 3 is a diagram showing an example of digitized fingerprint image.

The fingerprint image inputting part 11 digitizes a fingerprint image read via a fingerprint sensor or scanner, and stores the digitized fingerprint in the image in the fingerprint image storing part 12 for a temporary period. FIG. 3 shows the resultant image.

FIG. 3 shows an example of fingerprint image digitized at a resolution of 500 dpi, in accordance with the ANSI/NIST-CSL-1-1993 Data Format for the Interchange of Fingerprint, Facial & SMT Information, which was standardized by the National Institute of Standards and Technology in the U.S. This embodiment will be described below, using as an example a fingerprint image obtained by digitization usinng the above-mentioned method.

Figure 4:
FIG. 4 is an example of skeleton data extracted from the fingerprint image of FIG. 3.

The skeleton extracting part 12 first conducts the binarization process on a digitized fingerprint image and then the thinning process on the resultant image to obtain skeleton data, which is stored in the skeleton data storing part 14 for a temporary period. These binarization and thinning processes can be realized using a known art, for example, that is disclosed in Japanese Patent No. 2659046. FIG. 4 is an example of skeleton data extracted from the fingerprint image of FIG. 3.

The minutia extracting part 15 extracts minutiae of a fingerprint, such as end points and bifurcations, from skeleton data, and stores them in the minutia extracting part 16 for a temporary period. This minutia extracting process can be realized using a known art, for example, that is disclosed in Japanese Patent Laying-Open (Kokai) No. Showa 60-12674.

The skeleton stability extracting part 17 extracts skeleton stability using skeleton data and minutia data, and registers them in the skeleton stability data storing part 18.

Figure 5:
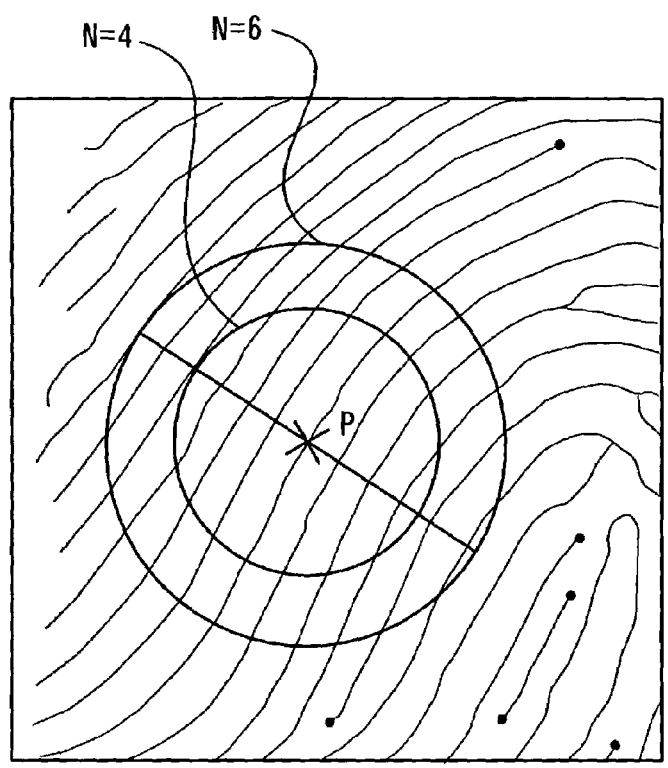
FIG. 5 is a diagram illustrating the concept of skeleton stability.

With reference to FIG. 5, the concept of skeleton stability obtained by the skeleton stability extracting part 17 of this embodiment will now be described. A point on a particular skeleton is assumed to be the attention point p. When a circle is drawn with the width of N number of skeletons as its radius around the point p, this attention point is defined as being stable at the width of the N number of skeletons, if the skeletons existing within the circle are highly reliable and if the circle does not contain any minutiae. By obtaining the maximum value of N, the skeleton stability for that attention point can be determined. In FIG. 5, less reliable areas are enclosed in shaded rectangles. For the attention point p in FIG. 5, the maximum value of N is 6. It should be noted here that the skeleton width of proximal skeletons may not necessarily be the same between the inner part and outer part of the fingerprint when viewed from the attention point. In order to deal with this problem, two semicircles with different radii may be drawn for the inner and outer parts of the fingerprint, respectively. Alternatively, either of the values may be used.

With reference to FIG. 2, the operation of extracting skeleton stability conducted by the skeleton stability extracting part 17 will now be described in detail.

When the operation of extracting skeleton stability begins, in Step A1, the skeleton stability extracting part 17 determines an attention point to extract skeleton stability and sets it as the initial attention point. In this embodiment, any pixel on skeleton data can be set as an attention point. While it is possible to set all the pixel points in the input image as attention points, this embodiment uses all the pixels on skeleton data as attention points in order to avoid having to handle a large amount of data during calculation and data registration.

If use of all the pixels on skeleton data leads to such an inhibitive amount of data to be handled during calculation or data registration that may cause problems when configuring a real-world apparatus or system, then one can choose to set every few pixels on skeleton data as attention points.

In Step A2 that follows, the skeleton stability extracting part 17 determines whether all the attention points set in Step A1 have been inspected or not. If the skeleton stability extracting process has been completed on all the attention points set in Step A1, this process is terminated.

If, in Step A2, it is found that skeleton stability has not been extracted for all the attention points set in Step A1, then the skeleton stability extracting part 17 proceeds to Step A3 and determines skeleton stability for the attention points yet to be inspected.

In Step A3, it sets the initial value of skeleton width for use as the unit of skeleton stability. In Step A4, it extracts the points of intersection between the perpendiculars drawn from the attention points and the group of proximal skeletons.

In this embodiment, N=4 is set as the initial value in Step A3. This is because the initial value of N=3 will result in defining skeleton stability for too many attention points; it has been proven statistically that such skeleton stability cannot effectively serve as distinctiveness.

When extracting points of intersection in Step A4, a perpendicular is first drawn from the attention point P. This perpendicular is drawn as follows. First, an attention point is traced along the skeleton, about 10 pixels each to the left and the right. Then, a line segment is drawn so that it will be vertical to the line segment defined by the two endpoints of the trace and that it will run through the attention point P. After this, a point of intersection is extracted between the perpendicular and the group of proximal skeletons.

In Step A5, the skeleton stability extracting part 17 checks the points of intersection with the group of proximal skeletons that it has extracted in Step A4 to see if the Nth point of intersection exists when counted from the attention point. If such point of intersection exists, it inspects to determine whether the skeletons up to that point of intersection are viable as a fingerprint. More specifically, this inspection goes from the first through the Nth groups of points of intersection, and determines that the reliability of a skeleton is low if the distance between two adjacent points of intersection is by far larger than the average ridge width in the fingerprint (for example, over three times larger).

If, in Step A5, the skeleton stability extracting part 17 determines that the Nth point of intersection from the attention point does exists and that the skeletons up to that point of intersection are viable as a fingerprint, then it proceeds to Step A6. If, on the other hand, it determines to the contrary, i.e., that the Nth point of intersection from the attention point does not exist or that the skeletons up to that point of intersection are not viable as a fingerprint, then it terminates the inspection of the attention points for skeleton stability and proceeds to Step A11.

In Step A6, the skeleton stability extracting part 17 calculates the distance D between the attention point P and the point of intersection with the Nth skeleton. In Step A7, it draws a circle with a radius of D around the attention point P, and inspects the skeletons existing in that circle.

In Step A8, it inspects the circle to see whether it contains minutiae, such as end points, bifurcations, and/or crosses. If the circle contains minutiae, it terminates the inspection of that attention point for skeleton stability and proceeds to Step A11. If the circle contains no minutiae, it proceeds to Step A9.

In Step A9, the skeleton stability extracting part 17 inspects to determine whether the skeletons within the Nth circle are reliable as a fingerprint. Reliability as a fingerprint can be determined by checking whether skeletons exists within that circle and these skeletons form a striped pattern with regular intervals. This evaluation can be done by, for example, calculating the distance from a point on each of the skeleton within the circle to an adjacent skeleton and comparing the resultant distance with the average distance between fingerprint ridges.

If the viability of the skeletons has been evaluated by other method, this information can be used in place of the results to be obtained by the above-described method. If the skeletons within the Nth circle is reliable, the skeleton stability extracting part 17 proceeds to Step A10. It increments the number N and returns to Step A4. If the skeletons within the Nth circle is not reliable, it terminates the inspection of the attention point for skeleton stability and proceeds to Step A11.

In Step A11, the skeleton stability extracting part 17 registers the skeleton stability for the attention point. It can reach this step when any of the following conditions is satisfied: in Step A5, the absence of the Nth point of intersection has been confirmed; in Step A8, the existence of minutiae within the Nth circle has been confirmed; or in Step A9, the skeletons within the Nth circle has been determined that they are not reliable. Since reaching this step means that the skeletons within the (N−1)th circle are stable, the skeleton stability extracting part 17 registers (N−1) as skeleton stability and proceeds to Step A12. Exceptionally, if N is the initial value (4, in this embodiment), then (N−1) is 3 and is not viable as skeleton stability, it proceeds to Step A12 without registering N.

In Step A12, the skeleton stability extracting part 17 sets the next attention point and returns to Step A2.

The process thereafter varies, depending on whether the input data are for registration or search.

If the input data are for registration, minutia data and skeleton stability data are retrieved from the input data by the database registering part 19, assigned an appropriate registration number, and registered in the database storing part 20 permanently. With this, the process completes.

If the input data are for search, the minutia data are retrieved from the input data by the minutia collating part 21 and collated with the minutia data already registered in the database. The method of collating minutiae can be realized using a known art, for example, that is disclosed in Japanese Patent No. 2659046.

Following this, the skeleton stability data are retrieved from the input data by the skeleton stability collating part 22 and collated with the skeleton stability data already registered in the database. Matching scores to represent the results of collation of skeleton stability according to this embodiment can be obtained, using the basic equations shown below.

$$S = \sum_{x,y} h(\min(f(X, Y), g(X, Y)))$$

f(X,Y): skeleton stability at coordinates (X,Y) of the attention point in the fingerprint on the search side g(X,Y): skeleton stability at coordinates (X,Y) of the most proximal attention point of the fingerprint on the registration side $h(s)=s^m$ (where $m$ is a parameter)

When comparing the degrees of skeleton stability between the search and registration sides, the smaller skeleton stability represents the size of the common zone in which skeletons are stable. A larger value of skeleton stability translates into a higher similarity in this zone. By calculating skeleton stability for all the attention points and adding up the results, the similarity for the skeleton stability can be scored.

The function h(s) is a function of the value s expressed in units of the area of the common zone in which skeletons are stable. In this embodiment, it is defined as an exponential function. In general, the larger the area of a common area is, a registered fingerprint is more likely to form a pair with a fingerprint for search. However, the probability of such pair being formed does not increase in linear proportion with the size of a common area; rather, the probability increases exponentially. The nilpotent m can be set at a value which will result in a large degree of separation between a registered fingerprint that forms a pair (mate fingerprint) and a registered fingerprint that does not form a pair (non-mate fingerprint).

The equation (1) above assumes that the process of aligning a fingerprint on the search side and a fingerprint on the registration side has been completed. This aligning process can easily be realized by use of the center or axial direction of the fingerprint. The method of extracting the center of a fingerprint can be realized using a known art, for example, that is disclosed in Japanese Patent No. 002690103 or No. 002637764. The method of extracting the axial direction of a fingerprint can be realized using a known art, for example, that is disclosed in Japanese Patent No. 002776757. The aligning process may also be conducted using the ridge direction in a small zone, as is disclosed in Japanese Patent Laying-Open (Kokai) No. 2001-243465.

The matching score based on the results of collating minutiae and the matching score based on the results of collating the degrees of skeleton stability are integrated by the matching score integration part 23 for the calculation of a final matching score. Examples of the method of integrating matching scores include arithmetic average and geometrical average.

The final matching score is output externally by the matching result outputting part 24 for the determination of the similarity between the search-side fingerprint and the registration-side fingerprint.

Separation between a mate fingerprint and non-mate fingerprints according to this embodiment will be described below.

Figure 8A:
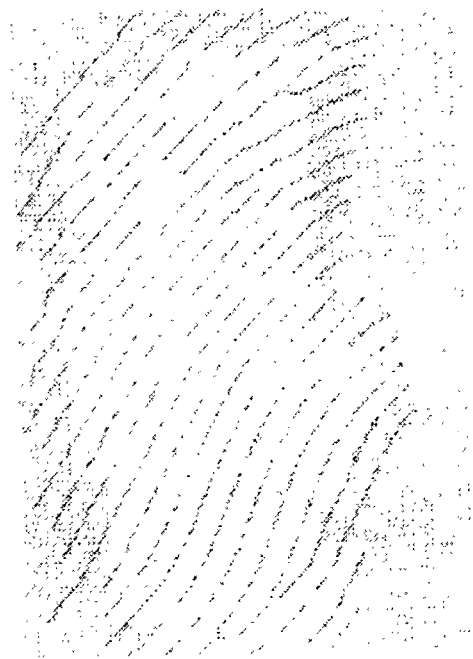
FIG. 8A shows the skeleton data of FIG. 7A.
Figure 8B:
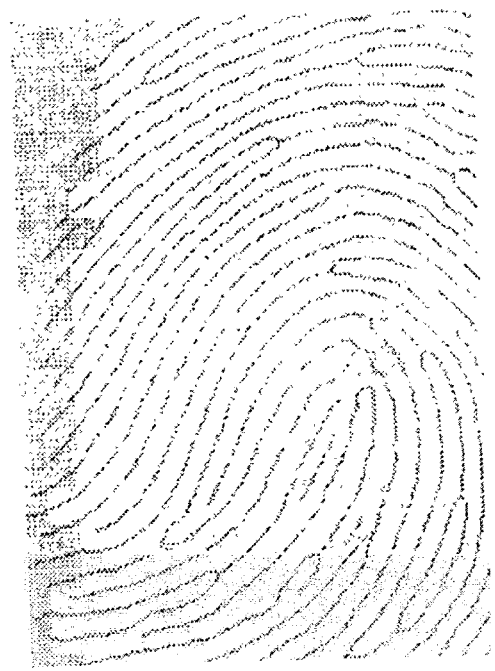
FIG. 8B shows the skeleton data of FIG. 7B.
Figure 9A:
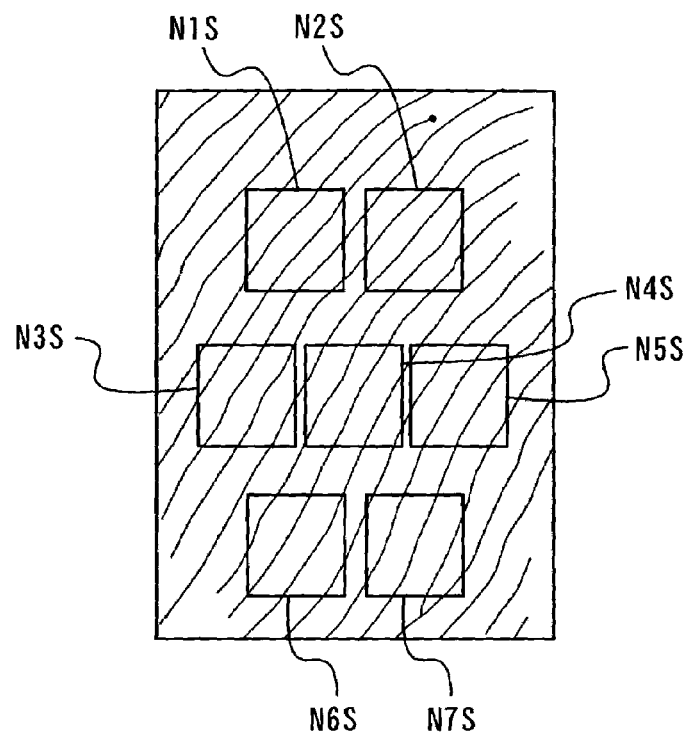
FIG. 9A is a diagram showing non-minutia data, N1S, N2S, . . . , N7S, on the search side in relation to the skeleton data of FIG. 8A.
Figure 9B:
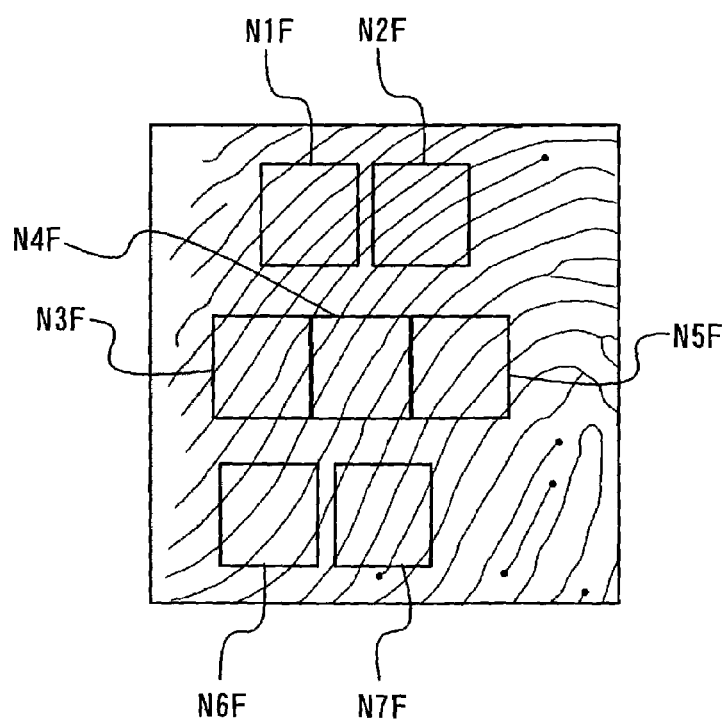
FIG. 9B is a diagram showing non-minutia data, N1F, N2F, . . . , N7F, in a mate fingerprint in relation to the skeleton data of FIG. 8B.
Figure 10A:
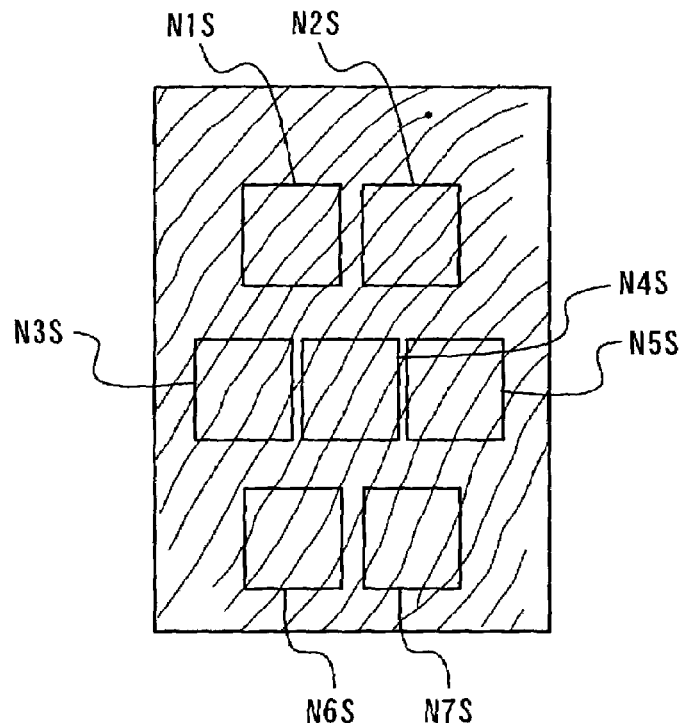
FIG. 10A is a diagram showing non-minutia data, N1S, N2S, . . . , N7S, on the search side in relation to the skeleton data of FIG. 8A.
Figure 10B:
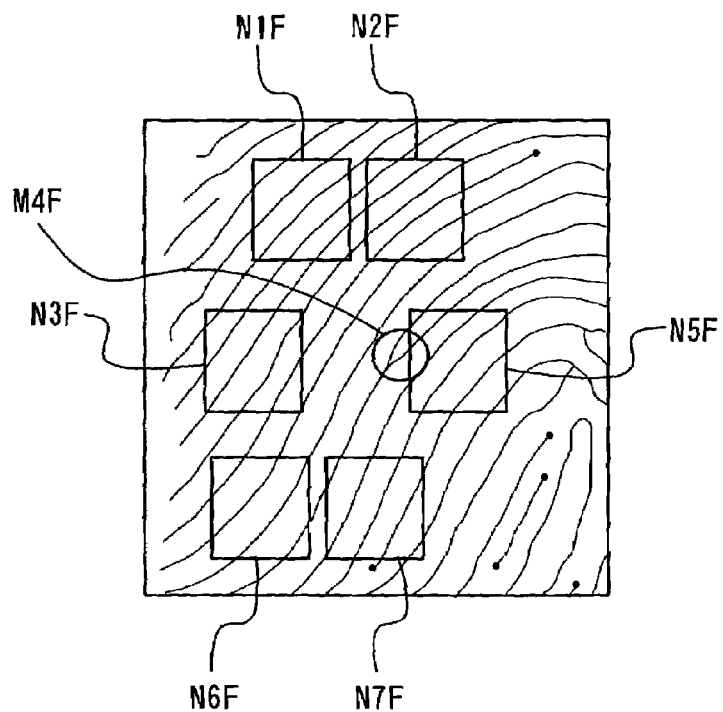
FIG. 10B is a diagram showing minutiae and non-minutia data of a non-mate fingerprint.
Figure 11A:
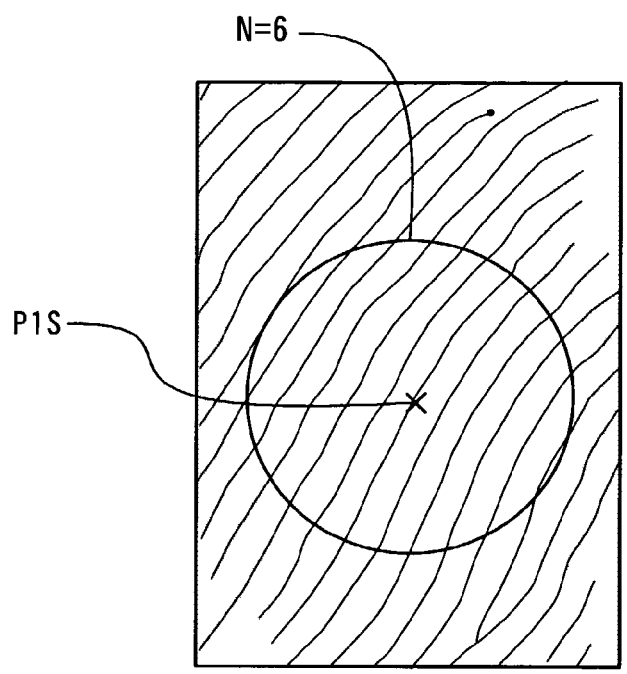
FIG. 11A is a diagram showing skeleton stability on the search side extracted using the method of the present invention, in relation to the skeleton data of FIG. 8A.
Figure 11B:
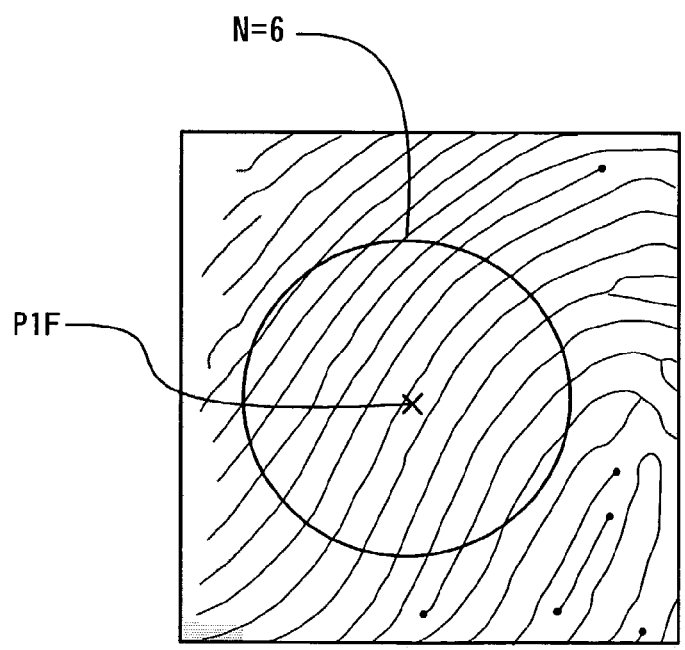
FIG. 11B is a diagram showing skeleton stability on the registration side extracted using the method of the present invention, in relation to the skeleton data of FIG. 8B.

FIGS. 11A and 11B show skeleton stability extracted using the method of the present embodiment, in relation to the skeleton data of FIGS. 8A and 8B.

Skeleton stability for the attention point, P1S, of the fingerprint for search and that for the attention point, P1F, which is the corresponding point of the registered fingerprint, are both 36. Skeleton stability, expressed as an area of a zone, is 36 for each, since these two attention points have a width of six skeletons (N=6), respectively. Collating skeleton stability data for these mate fingerprints using equation (1) results in 1296 (36×36) points (where the parameter m is 2).

Figure 12A:
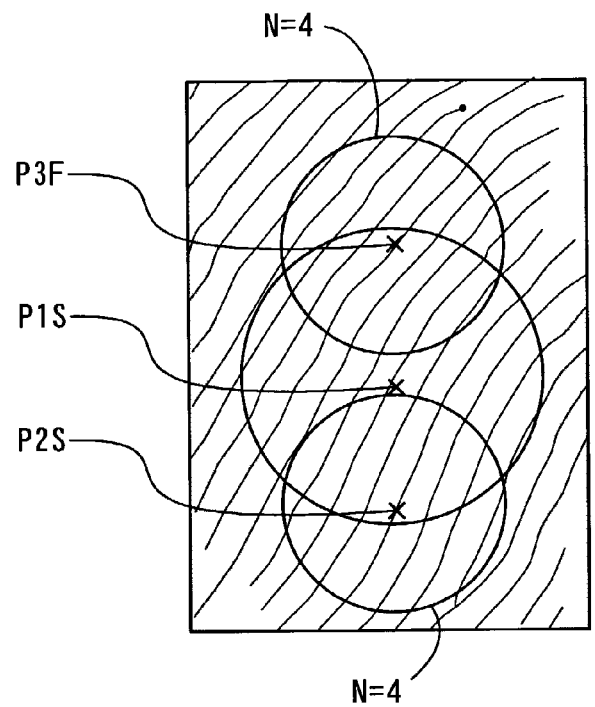
FIG. 12A is a diagram showing skeleton stability on the search side extracted using the method of the present invention, and skeleton stability matching to the registration side shown on FIG. 12B.
Figure 12B:
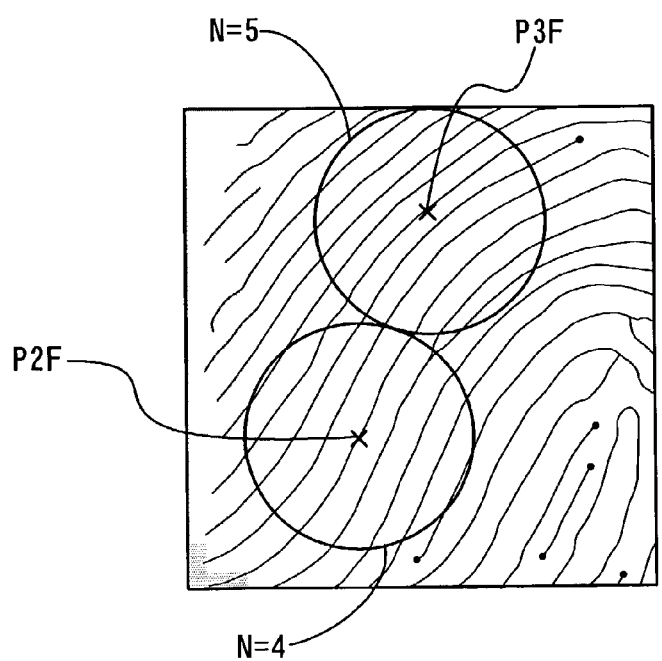
FIG. 12B is a diagram showing skeleton stability on the registration side extracted using the method of the present invention, when the fingerprint on the registration side is a non-mate fingerprint.

In FIGS. 12A and 12B, the fingerprint on the registration side is a non-mate fingerprint. Skeleton stability, which was extracted for the two attention points, P2F and P3F, are 16 and 25, respectively. Skeleton stability is 16 for both the positions, P2S and P3S, on the search side that correspond to the positions, P2F and P3F. Collating skeleton stability data for this non-mate fingerprint using equation (1) results in 512(16×16+16×16) points (where the parameter m is 2). These scores, i.e., 1296 points for the mate fingerprint and 512 points for the non-mate fingerprint, represent a large degree of separation between the mate fingerprint and the non-mate fingerprint.

By defining the size of a zone having no minutiae as a degree of skeleton stability, which is a new concept of distinctiveness, and collating fingerprints using such distinctiveness, matching accuracy can be improved even with fingerprints having an inadequate number of minutiae.

Other embodiments of the present invention will now be described in detail referring to the drawings.

The above-described embodiment includes a minutia extracting part 15 in its configuration, as shown in FIG. 1. Since minutiae can easily be extracted from a skeleton image, the skeleton stability extracting part 17 may be designed to also extract minutiae while conducting the skeleton data inspection process.

Figure 6:
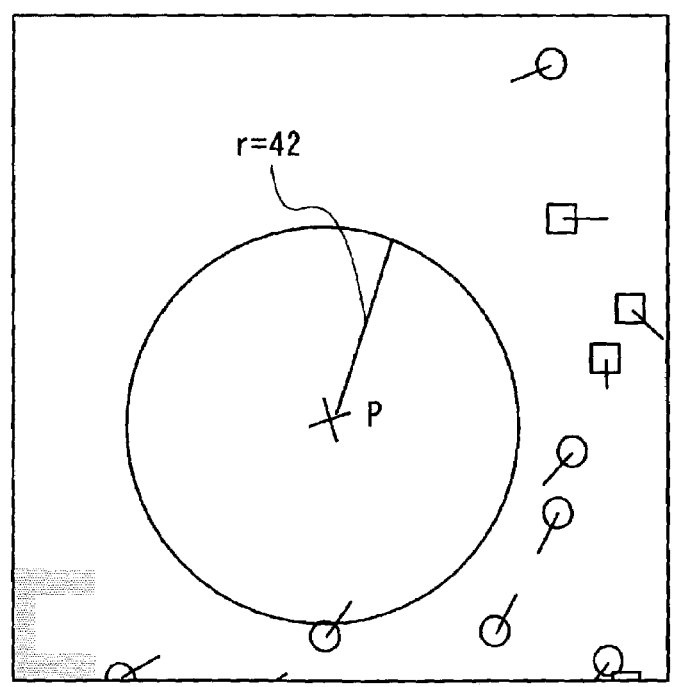
FIG. 6 is a diagram illustrating the concept of defining skeleton stability by means of the radius of a circle that is inscribed in a zone with stable skeletons.
Figure 7A:
FIG. 7A is an example of gray scale image of a latent fingerprint that is a fingerprint on the search side.
Figure 7B:
FIG. 7B is an example of gray scale image of a mate fingerprint that is a fingerprint on the registration side.

Furthermore, while, as shown in FIG. 5, the above-described embodiment defines skeleton stability in units of skeleton width, skeleton stability may be defined using the radius of a circle that is inscribed in a zone. The concept of such definition will be described below with reference to FIG. 6. A particular attention point is assumed to be the point P. When a circle is drawn with a radius of r around the point P, this attention point is defined as being stable within this circle with a radius of r, if the skeletons existing within the circle are highly reliable and if the circle does not contain any minutiae. By obtaining the maximum value of r, the skeleton stability for that attention point can be determined. In FIG. 6, less reliable areas are enclosed in shaded rectangles.

At the attention point P in FIG. 6, the maximum value of r is 42 pixels. This configuration, in which skeleton stability is defined with the radius of a circle, has an advantage that skeleton stability can easily be calculated as far as minutia data and skeleton reliability data are available. At the same time, however, it has a drawback that skeleton stability is liable to vary under the influence of changes in fingerprint size and image distortion.

While, as shown in FIG. 1, the above-described embodiment uses a configuration in which a minutia collating part 21 and a skeleton stability collating part 22 are separate from each other, it is possible to combine the processes conducted by these parts in one component. For example, comparing skeleton stability data between search-side and registration-side after adjusting position by using the aligning data determined by collating minutiae will provide fairly accurate evaluation. Furthermore, for the purpose of collating minutiae, a possible method will be to subtract a penalty from the score according to the number of minutiae that remain unmatched and cannot form a pair. An embodiment using this method is also described in Japanese Patent No. 002730179.

It is a rational method to subtract some points from a score as penalty if one fingerprint has minutiae at various positions and the other fingerprint does not have minutiae at some of the corresponding positions.

The amount of subtraction may be calculated using skeleton stability. More specifically, if one fingerprint has minutiae at various positions, it becomes possible to score similarity more accurately by increasing the amount of subtraction in proportion to the degree of skeleton stability at the positions that correspond to those of minutiae in the other fingerprint.

In addition to realizing various functions of the above-described elements as a hardware product, the fingerprint matching apparatus according to the present invention can be realized by loading a fingerprint matching program (application) incorporating the functions of the above-described elements, e.g., skeleton extracting part 13, minutia extracting part 15, skeleton stability extracting part 17, minutia collating part 21, skeleton stability collating part 22, and matching score integration part 23, in a memory of a computer processor, and controlling the computer processor. This fingerprint matching program allows the user to realize the above-described functions by storing it in a magnetic disc, semiconductor memory, or other storing medium, loading it from such storing medium onto a computer processor, and controlling such computer processor.

Because of its configuration as described in the foregoing, the present invention has effects of improving matching accuracy by using skeleton stability to represent distinctiveness, even if a fingerprint does not have a sufficient number of minutiae to guarantee highly reliable collation of minutiae.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the minutiae set out in the appended claims.

The invention claimed is:

1. A fingerprint matching method, comprising the steps of:
   in a fingerprint image, extracting as skeleton stability the area of a zone which is drawn around a pre-determined attention point and which does not contain any minutiae that are bifurcations or endpoints in ridges forming a fingerprint pattern; and
   calculating similarity by collating said skeleton stability thus extracted with skeleton stability already registered.

2. The fingerprint matching method as set forth in claim 1, comprising the step of
   representing said skeleton stability as a number that expresses the radius of a circle inscribed in a zone having no minutiae in units of skeleton width.

3. The fingerprint matching method as set forth in claim 1, comprising the step of
   representing said skeleton stability as the radius of a circle inscribed in a zone having no minutiae.

4. The fingerprint matching method as set forth in claim 1, comprising the step of
   limiting attention points to those points that are on skeletons.

5. The fingerprint matching method as set forth in claim 1, comprising the steps of
   along with said skeleton stability, extracting minutiae in said fingerprint image and calculating similarity by also collating the extracted minutiae with the minutiae already registered; and
   integrating the similarity based on said skeleton stability with the similarity based on said minutiae, and determining the similarity between fingerprints.

6. The fingerprint matching method as set forth in claim 1, comprising the steps of
   representing said skeleton stability as a number that expresses the radius of a circle inscribed in a zone having no minutiae in units of skeleton width;

along with said skeleton stability, extracting minutiae in said fingerprint image and calculating similarity by also collating the extracted minutiae with the minutiae already registered; and integrating the similarity based on said skeleton stability with the similarity based on said minutiae, and determining the similarity for a fingerprint.

7. The fingerprint matching method as set forth in claim 1, comprising the steps of representing said skeleton stability as the radius of a circle inscribed in a zone having no minutiae;

along with said skeleton stability, extracting minutiae in said fingerprint image and calculating similarity by also collating the extracted minutiae with the minutiae already registered; and integrating the similarity based on said skeleton stability with the similarity based on said minutiae, and determining the similarity for a fingerprint.

8. The fingerprint matching method as set forth in claim 1, comprising the steps of limiting attention points to those points that are on skeletons;

along with said skeleton stability, extracting minutiae in said fingerprint image and calculating similarity by also collating the extracted minutiae with the minutiae already registered; and integrating the similarity based on said skeleton stability with the similarity based on said minutiae, and determining the similarity for a fingerprint.

9. A fingerprint matching apparatus, comprising:

a fingerprint image inputting means into which a fingerprint image is input;

a skeleton stability extracting means for, in relation to the fingerprint image input into said fingerprint image inputting means, extracting as skeleton stability for use in collation of fingerprints the area of a zone which is drawn around a pre-determined attention point and which does not contain any minutiae that are bifurcations or endpoints in ridges forming a fingerprint pattern; and a skeleton stability collating means for calculating similarity by collating said skeleton stability thus extracted with skeleton stability already registered.

10. The fingerprint matching apparatus as set forth in claim 9, wherein said skeleton stability extracting means represents said skeleton stability as a number that expresses the radius of a circle inscribed in a zone having no minutiae in units of skeleton width.

11. The fingerprint matching apparatus as set forth in claim 9, wherein said skeleton stability collating means represents skeleton stability as the radius of a circle inscribed in a zone having no minutiae.

12. The fingerprint matching apparatus as set forth in claim 9, wherein said skeleton stability extracting means limits attention points to those points that are on skeletons.

13. The fingerprint matching apparatus as set forth in claim 9, further comprising a minutiae extracting means for, in relation to the fingerprint input into said fingerprint image inputting means, extracting minutiae for use in collation of fingerprints, along with skeleton stability;

a minutia collating means for calculating similarity by collating said minutiae thus extracted with minutiae already registered; and a matching score integration means for integrating the similarity based on said skeleton stability with the similarity based on said minutiae, and calculating similarity.

14. The fingerprint matching apparatus as set forth in claim 9, wherein said skeleton stability extracting means represents said skeleton stability as a number that expresses the radius of a circle inscribed in a zone having no minutiae in units of skeleton width;

and further comprising a minutiae extracting means for, in relation to the fingerprint input into said fingerprint image inputting means, extracting minutiae for use in collation of fingerprints, along with skeleton stability;

a minutia collating means for calculating similarity by collating said minutiae thus extracted with minutiae already registered; and a matching score integration means for integrating the similarity based on said skeleton stability with the similarity based on said minutiae, and calculating similarity.

15. The fingerprint matching apparatus as set forth in claim 9, wherein said skeleton stability collating means represents skeleton stability as the radius of a circle inscribed in a zone having no minutiae;

and further comprising a minutiae extracting means for, in relation to the fingerprint input into said fingerprint image inputting means, extracting minutiae for use in collation of fingerprints, along with skeleton stability;

a minutia collating means for calculating similarity by collating said minutiae thus extracted with minutiae already registered; and a matching score integration means for integrating the similarity based on said skeleton stability with the similarity based on said minutiae, and calculating similarity.

16. A fingerprint matching program that is run on a computer for matching fingerprints, comprising the functions of:

in a fingerprint image, extracting as skeleton stability the area of a zone which is drawn around a pre-determined attention point and which does not contain any minutiae that are bifurcations or endpoints in ridges forming a fingerprint pattern; and calculating similarity by collating said skeleton stability thus extracted with skeleton stability already registered.

17. The fingerprint matching program as set forth in claim 16, comprising the function of representing said skeleton stability as a number that expresses the radius of a circle inscribed in a zone having no minutiae in units of skeleton width.

18. The fingerprint matching program stored on a compuer-readable-medium as set forth in claim 16, further comprising the functions of along with said skeleton stability, extracting minutiae in said fingerprint image and calculating similarity by also collating the extracted minutiae with the minutiae already registered; and integrating the similarity based on said skeleton stability with the similarity based on said minutiae, and determining the similarity between fingerprints.

* * * * *